US008699161B2

(12) United States Patent
Livshitz et al.

(10) Patent No.: US 8,699,161 B2
(45) Date of Patent: Apr. 15, 2014

(54) STORAGE DEVICE HAVING WRITE SIGNAL WITH MULTIPLE-SLOPE DATA TRANSITION

(75) Inventors: Boris Livshitz, Eagan, MN (US); Jeffrey A. Gleason, Burnsville, MN (US); Jason S. Goldberg, Saint Paul, MN (US); Paul Mazur, Cottage Grove, MN (US); Cameron C. Rabe, Inver Grove Heights, MN (US)

(73) Assignee: LSI Corporation, San Jose, CA (US)

( * ) Notice: Subject to any disclaimer, the term of this patent is extended or adjusted under 35 U.S.C. 154(b) by 126 days.

(21) Appl. No.: 13/416,443

(22) Filed: Mar. 9, 2012

(65) Prior Publication Data

US 2013/0235485 A1 Sep. 12, 2013

(51) Int. Cl.
*G11B 5/09* (2006.01)
(52) U.S. Cl.
USPC ............ 360/46; 360/43; 360/40; 360/51; 360/55
(58) Field of Classification Search
None
See application file for complete search history.

(56) References Cited

U.S. PATENT DOCUMENTS

| 5,612,828 | A | 3/1997 | Brannon et al. |
|---|---|---|---|
| 6,201,653 | B1 | 3/2001 | Contreras et al. |
| 6,246,269 | B1 | 6/2001 | Schuler et al. |
| 6,246,533 | B1 | 6/2001 | Davis et al. |
| 6,366,421 | B2 | 4/2002 | Teterud |
| 6,381,086 | B1 | 4/2002 | Koenig et al. |
| 6,683,740 | B1 | 1/2004 | Jung et al. |
| 7,492,684 | B2 * | 2/2009 | Chang et al. ............... 369/53.19 |
| 7,872,825 | B2 | 1/2011 | Sanghvi |
| 8,049,982 | B1 | 11/2011 | Grundvig et al. |
| 8,330,324 | B2 * | 12/2012 | Casey et al. ................... 310/317 |
| 2003/0081339 | A1 | 5/2003 | Barnett et al. |
| 2006/0072229 | A1 | 4/2006 | Yun et al. |
| 2008/0002267 | A1 | 1/2008 | Jang et al. |
| 2011/0304373 | A1 | 12/2011 | Ghosh et al. |

OTHER PUBLICATIONS

W. Scholz et al., "Effect of Write Current Waveform on Magnetization and Head-Field Dynamics of Perpendicular Recording Heads," IEEE Transactions on Magnetics, Oct. 2006, pp. 2264-2266, vol. 42, No. 10.
W. Scholz et al., "Micromagnetic Modeling of Head Field Rise Time for High Data-Rate Recording," IEEE Transactions on Magnetics, Feb. 2005, pp. 702-706, vol. 41, No. 2.
U.S. Appl. No. 13/302,169 filed in the name of Boris Livshitz on Nov. 22, 2011 and entitled "Magnetic Recording System With Multi-Level Write Current."

* cited by examiner

*Primary Examiner* — Muhammad N Edun
(74) *Attorney, Agent, or Firm* — Ryan, Mason & Lewis, LLP (57) ABSTRACT

A hard disk drive or other disk-based storage device comprises a storage disk, a read/write head configured to read data from and write data to the disk, and control circuitry coupled to or otherwise associated with the read/write head. The control circuitry comprises a write driver configured to generate a write signal for data to be written to the storage disk, and a multiple-slope transition controller associated with the write driver and configured to control a data transition in the write signal such that the data transition comprises at least two different segments each having a different slope, with the transition controller comprising separate slope control mechanisms for each of the segments. By way of example, the data transition may comprise a dual-slope transition having first and second segments arranged sequentially between a start point and an end point of the data transition.

22 Claims, 6 Drawing Sheets

STORAGE DEVICE HAVING WRITE SIGNAL WITH MULTIPLE-SLOPE DATA TRANSITION

BACKGROUND

Disk-based storage devices such as hard disk drives (HDDs) are used to provide non-volatile data storage in a wide variety of different types of data processing systems. A typical HDD comprises a spindle which holds one or more flat circular storage disks, also referred to as platters. Each storage disk comprises a substrate made from a non-magnetic material, such as aluminum or glass, which is coated with one or more thin layers of magnetic material. In operation, data is read from and written to tracks of the storage disk via a read/write head that is moved precisely across the disk surface by a positioning arm as the disk spins at high speed.

The storage capacity of HDDs continues to increase, and HDDs that can store multiple terabytes (TB) of data are currently available. However, increasing the storage capacity often involves shrinking track dimensions, bit lengths or other features in order to fit more data onto each storage disk, which can lead to a variety of problems, including degraded on-track recording performance, as well as off-track recording performance issues such as adjacent track erasure.

A number of techniques have been developed in an attempt to further increase storage capacity. For example, a technique known as shingled magnetic recording (SMR) attempts to increase storage capacity of an HDD by "shingling" a given track over a previously written adjacent track on a storage disk. In another technique, referred to as bit-patterned media (BPM), high density tracks of magnetic islands are preformed on the surface of the storage disk, and bits of data are written to respective ones of these islands. Other techniques include, for example, heat-assisted magnetic recording (HAMR) and microwave-assisted magnetic recording (MAMR). The HAMR technique utilizes a laser to locally preheat an area on the disk surface prior to recording in that area. In the MAMR technique, an additional write head is configured to emit an AC magnetic field that excites ferromagnetic resonance in the media, building up energy that eases the process of writing data.

HDDs often include a system-on-chip (SOC) to process data from a computer or other processing device into a suitable form to be written to the storage disk, and to transform signal waveforms read back from the storage disk into data for delivery to the computer. The SOC has extensive digital circuitry and has typically utilized advanced complementary metal-oxide-semiconductor (CMOS) technologies to meet cost and performance objectives. The HDD also generally includes a preamplifier that interfaces the SOC to the read/write head used to read data from and write data to the storage disk.

The preamplifier generally comprises one or more write drivers that provide corresponding write signals to the read/write head in order to write data to the storage disk. Such write signals are generally characterized as current signals, but may alternatively be characterized as voltage signals. Data bits are usually each stored as group of media grains oriented in a common magnetization direction (e.g., up or down). In order to record a given data bit, the write driver generates a write signal that transitions from a negative write current to a positive write current, or vice-versa, where the magnitude of the write current from zero to its peak value may be in the range of about 15 to 65 milliamperes (mA), although different values can be used.

In a typical conventional arrangement, a given write signal at the output of a write driver has single-slope low-to-high data transitions (i.e., from "0" to "1") and single-slope high-to-low data transitions (i.e., from "1" to "0"). These low-to-high and high-to-low transitions are also referred to as rising and falling transitions, respectively. The slope of the rising transition or falling transition is characterized by a rise time or fall time as well as an amplitude difference between start and end points. The fall time is also characterized herein as a rise time for a transition of opposite polarity.

Writing data to the storage disk at high speeds can be challenging when utilizing conventional write signals having single-slope data transitions. For example, use of such write signals can adversely impact on-track recording performance in terms of recorded data fidelity as well as off-track recording performance due to issues such as adjacent track erasure. This is particularly true in the case of storage devices having wrap-around or side-shielded write heads in which the shields are in close proximity to the main write pole.

SUMMARY

Illustrative embodiments of the invention provide HDDs or other types of disk-based storage devices that exhibit enhanced operating performance by generating write signals with dual-slope data transitions or other types of multiple-slope data transitions. Such multiple-slope data transitions may be rising or falling transitions, or a combination of both rising and falling transitions.

In one embodiment, an HDD or other disk-based storage device comprises a storage disk, a read/write head configured to read data from and write data to the storage disk, and control circuitry that is configured to process data received from and supplied to the read/write head. The control circuitry more particularly comprises a write driver configured to generate a write signal for data to be written to the storage disk, and a multiple-slope transition controller associated with the write driver and configured to control a data transition in the write signal such that the data transition comprises at least two different segments each having a different slope. The multiple-slope transition controller comprises separate slope control mechanisms for each of the segments.

By way of example, the data transition may comprise a dual-slope transition having first and second segments arranged sequentially between a start point and an end point of the data transition, with the slope of the first segment being greater than or less than the slope of the second segment.

In such an arrangement, the separate slope control mechanisms may comprise a first controllable delay element arranged in a steady state path of the write driver for controlling a slope of a first one of the segments, and a second controllable delay element arranged in an overshoot path of the write driver for controlling a slope of a second one of the segments. The first and second controllable delay elements may be independently controllable in a manner that allows different slopes to be established for steady state and overshoot segments of the data transition.

One or more of the embodiments of the invention provide significant improvements in disk-based storage devices. For example, by utilizing write signals having multiple-slope data transitions, fidelity of recorded data is enhanced, and adverse impacts such as adjacent track erasure can be significantly reduced, even for data written at high speeds and using write heads with wrap-around or side-shielded main poles. This leads to improved overall operating performance of the disk-based storage device, including both on-track recording performance and off-track recording performance.

DETAILED DESCRIPTION

Embodiments of the invention will be illustrated herein in conjunction with exemplary disk-based storage devices, write drivers and associated multiple-slope transition controllers. It should be understood, however, that these and other embodiments of the invention are more generally applicable to any storage device in which improved recorded data fidelity and operating performance are desired. Additional embodiments may be implemented using components other than those specifically shown and described in conjunction with the illustrative embodiments.

Figure 1:
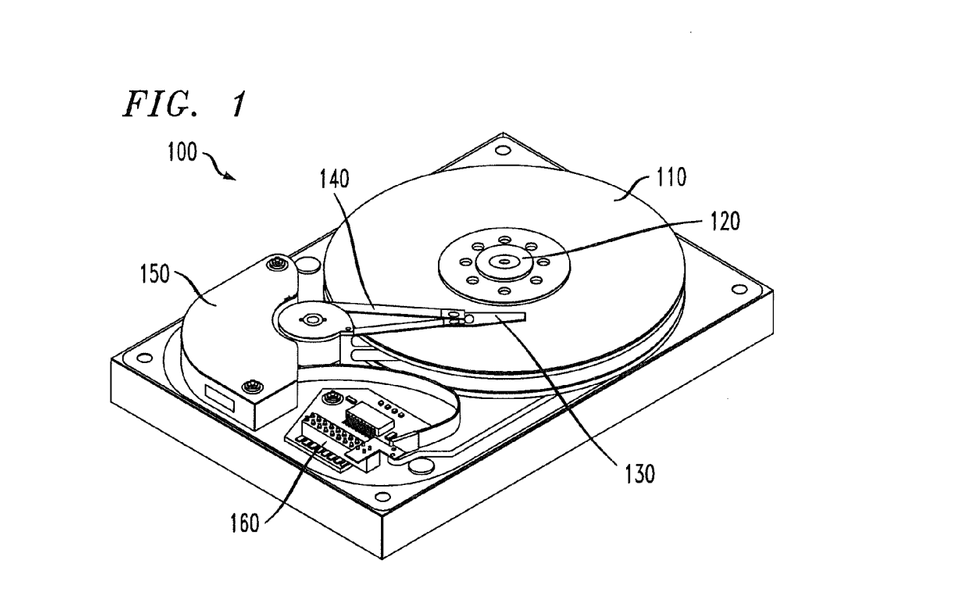
FIG. 1 shows a perspective view of a disk-based storage device in accordance with an illustrative embodiment of the invention.

FIG. 1 shows a disk-based storage device 100 in accordance with an illustrative embodiment of the invention. The storage device 100 in this embodiment more specifically comprises an HDD that includes a storage disk 110. The storage disk 110 has a storage surface coated with one or more magnetic materials that are capable of storing data bits in the form of respective groups of media grains oriented in a common magnetization direction (e.g., up or down). The storage disk 110 is connected to a spindle 120. The spindle 120 is driven by a spindle motor, not explicitly shown in the figure, in order to spin the storage disk 110 at high speed.

Figure 8:
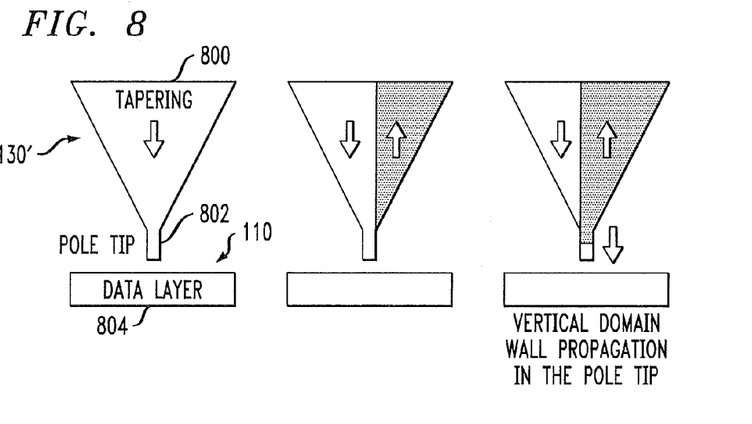
FIG. 8 illustrates the manner in which a portion of a read/write head is magnetized to write data to a data layer of a storage disk using the write signal of FIG. 7.
Figure 10:
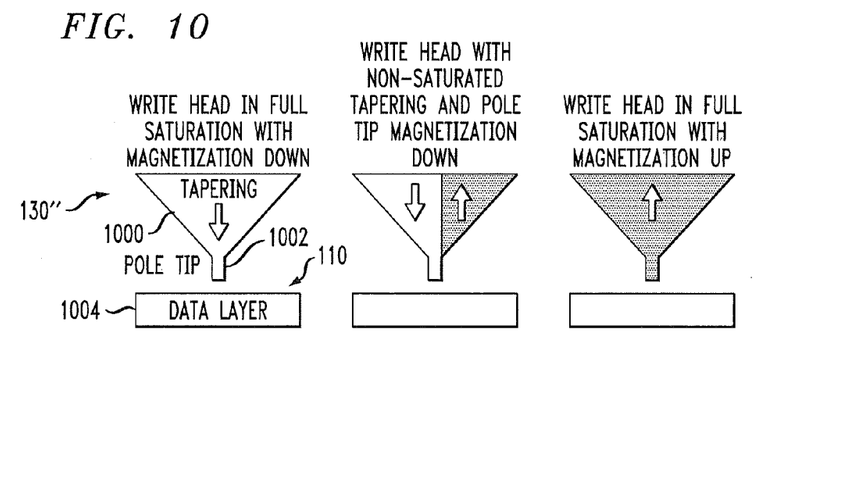
FIG. 10 illustrates the manner in which a portion of a read/write head is magnetized to write data to a data layer of a storage disk using the write signal of FIG. 9.

Data is read from and written to the storage disk 110 via a read/write head 130 that is mounted on a positioning arm 140. It is to be appreciated that the head 130 is shown only generally in FIG. 1, although more detailed examples of various features of such a head are illustrated in FIGS. 8 and 10. The position of the read/write head 130 over the magnetic surface of the storage disk 110 is controlled by an electromagnetic actuator 150. The electromagnetic actuator 150 and its associated driver circuitry in the present embodiment may be viewed as comprising a portion of what is more generally referred to herein as "control circuitry" of the storage device 100. Such control circuitry in this embodiment is assumed to further include additional electronics components arranged on an opposite side of the assembly and therefore not visible in the perspective view of FIG. 1. The term "control circuitry" as used herein is therefore intended to be broadly construed so as to encompass, by way of example and without limitation, drive electronics, signal processing electronics, and associated processing and memory circuitry, and may encompass additional or alternative elements utilized to control positioning of a read/write head relative to a storage surface of a storage disk in a storage device. A connector 160 is used to connect the storage device 100 to a host computer or other related processing device.

It is to be appreciated that, although FIG. 1 shows an embodiment of the invention with only one instance of each of the single storage disk 110, read/write head 130, and positioning arm 140, this is by way of illustrative example only, and alternative embodiments of the invention may comprise multiple instances of one or more of these or other drive components. For example, one such alternative embodiment may comprise multiple storage disks attached to the same spindle so all such disks rotate at the same speed, and multiple read/write heads and associated positioning arms coupled to one or more actuators.

A given read/write head as that term is broadly used herein may be implemented in the form of a combination of separate read and write heads. More particularly, the term "read/write" as used herein is intended to be construed broadly as read and/or write, such that a read/write head may comprise a read head only, a write head only, a single head used for both reading and writing, or a combination of separate read and write heads. Such heads may comprise, for example, write heads with wrap-around or side-shielded main poles, or any other types of heads suitable for recording and/or reading data on a storage disk. Read/write head 130 when performing write operations may be referred to herein as simply a write head.

Also, the storage device 100 as illustrated in FIG. 1 may include other elements in addition to or in place of those specifically shown, including one or more elements of a type commonly found in a conventional implementation of such a storage device. These and other conventional elements, being well understood by those skilled in the art, are not described in detail herein. It should also be understood that the particular arrangement of elements shown in FIG. 1 is presented by way of illustrative example only. Those skilled in the art will recognize that a wide variety of other storage device configurations may be used in implementing embodiments of the invention.

Figure 2:
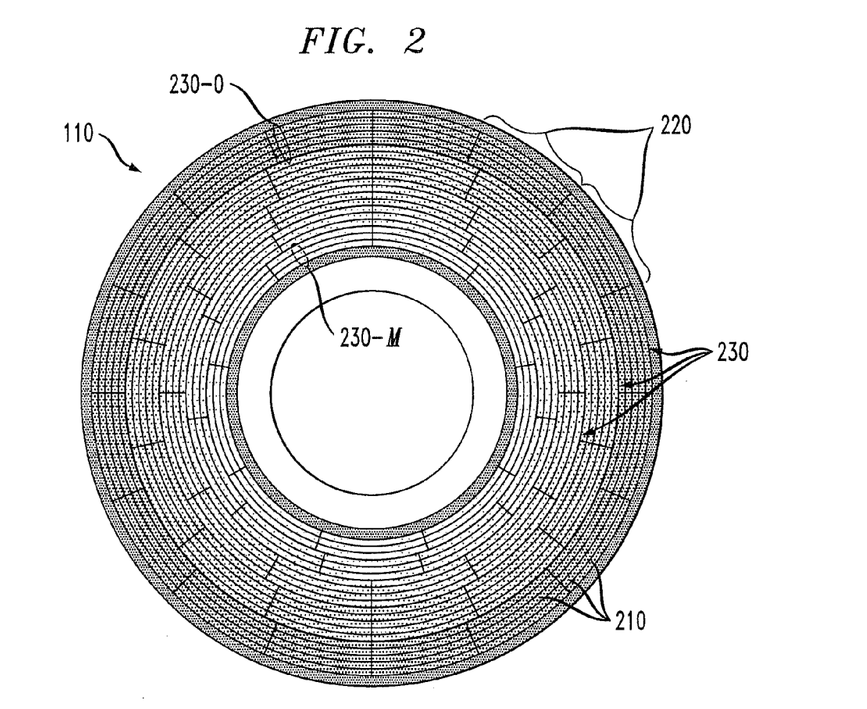
FIG. 2 shows a plan view of a storage disk in the storage device of FIG. 1.

FIG. 2 shows the storage surface of the storage disk 110 in greater detail. As illustrated, the storage surface of storage disk 110 comprises a plurality of concentric tracks 210. Each track is subdivided into a plurality of sectors 220 which are capable of storing a block of data for subsequent retrieval. The tracks located toward the outside edge of the storage disk have a larger circumference when compared to those located toward the center of the storage disk. The tracks are grouped into several annular zones 230, where the tracks within a given one of the zones have the same number of sectors. Those tracks in the outer zones have more sectors than those located in the inner zones. In this example, it is assumed that the storage disk 110 comprises M+1 zones, including an outermost zone 230-0 and an innermost zone 230-M.

The outer zones of the storage disk 110 provide a higher data transfer rate than the inner zones. This is in part due to the fact that the storage disk in the present embodiment, once accelerated to rotate at operational speed, spins at a constant angular or radial speed regardless of the positioning of the read/write head, but the tracks of the inner zones have smaller circumference than those of the outer zones. Thus, when the read/write head is positioned over one of the tracks of an outer zone, it covers a greater linear distance along the disk surface for a given 360° turn of the storage disk than when it is positioned over one of the tracks of an inner zone. Such an arrangement is referred to as having constant angular velocity (CAV), since each 360° turn of the storage disk takes the same amount of time, although it should be understood that CAV operation is not a requirement of embodiments of the invention.

Data bit density is generally constant across the entire storage surface of the storage disk 110, which results in higher data transfer rates at the outer zones. Accordingly, the outermost annular zone 230-0 of the storage disk has a higher average data transfer rate than the innermost annular zone 230-M of the storage disk. The average data transfer rates may differ between the innermost and outermost annular zones in a given embodiment by more than a factor of two. As one example embodiment, provided by way of illustration only, the outermost annular zone may have a data transfer rate of approximately 2.3 Gigabits per second (Gb/s), while the innermost annular zone has a data transfer rate of approximately 1.0 Gb/s. In such an implementation, the HDD may more particularly have a total storage capacity of 500 GB and a spindle speed of 7200 RPM, with the data transfer rates ranging, as noted above, from about 2.3 Gb/s for the outermost zone to about 1.0 Gb/s for the innermost zone.

The storage disk 110 may be assumed to include a timing pattern formed on its storage surface. Such a timing pattern may comprise one or more sets of servo address marks (SAMs) or other types of servo marks formed in particular sectors in a conventional manner. SAMs may therefore be viewed as an example of what are more specifically referred to herein as servo marks.

The particular data transfer rates and other features referred to in the embodiment described above are presented for purposes of illustration only, and should not be construed as limiting in any way. A wide variety of other data transfer rates and storage disk configurations may be used in other embodiments.

Embodiments of the invention will be described below in conjunction with FIGS. 3 to 10, in which the storage device 100 of FIG. 1 is configured to implement at least one write driver having an associated multiple-slope transition controller. The write driver is configured to generate a write signal for data to be written to the storage disk, and the multiple-slope transition controller is configured to control a data transition in the write signal such that the data transition comprises at least two different segments each having a different slope. More particularly, in these embodiments, the multiple-slope transition controller is implemented as a dual-slope transition controller. A given write signal data transition controlled by the dual-slope controller may comprise a rising transition or a falling transition, and the transition is a dual-slope transition having first and second segments arranged sequentially between a start point and an end point of the data transition with the slope of the first segment being greater than or less than the slope of the second segment. It is to be appreciated, however, that other embodiments may implement transition controllers in which more than two segments of different slopes are present within a given transition.

Figure 3:
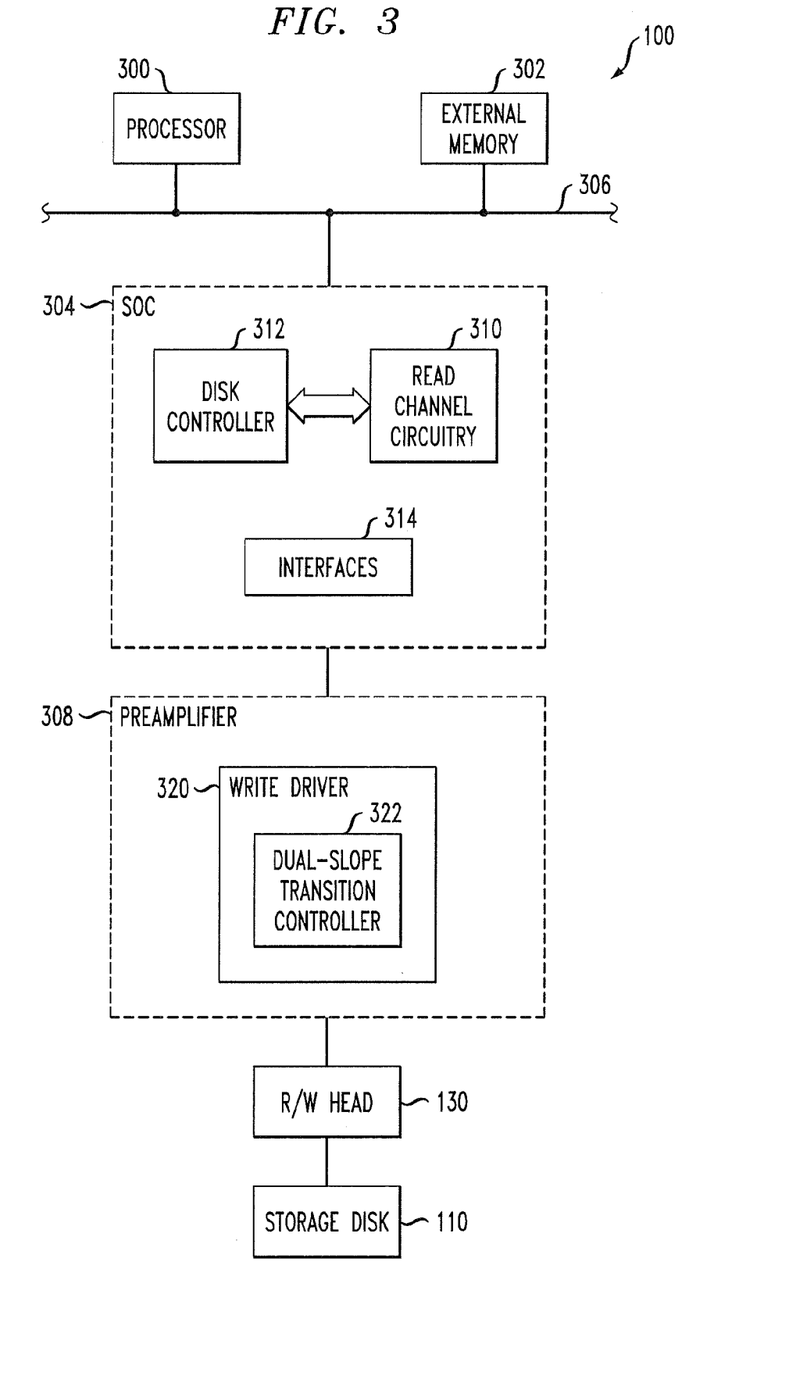
FIG. 3 is a block diagram of a portion of the storage device of FIG. 1 including a preamplifier comprising a write driver and a dual-slope transition controller.

FIG. 3 shows a portion of the storage device 100 of FIG. 1 in greater detail. In this view, the storage device 100 comprises a processor 300, a memory 302 and a system-on-a-chip (SOC) 304, which communicate over a bus 306. The storage device further comprises a preamplifier 308 providing an interface between the SOC 304 and the read/write head 130. The memory 302 is an external memory relative to the SOC 304 and other components of the storage device 100, but is nonetheless internal to that storage device. The SOC 304 in the present embodiment includes read channel circuitry 310 and a disk controller 312, and directs the operation of the read/write head 130 in reading data from and writing data to the storage disk 110.

The bus 306 may comprise, for example, one or more interconnect fabrics. Such fabrics may be implemented in the present embodiment as Advanced eXtensible Interface (AXI) fabrics, described in greater detail in, for example, the Advanced Microcontroller Bus Architecture (AMBA) AXI v2.0 Specification, which is incorporated by reference herein. The bus may also be used to support communications between other system components, such as between the SOC 304 and the preamplifier 308. It should be understood that AXI interconnects are not required, and that a wide variety of other types of bus configurations may be used in embodiments of the invention.

The processor 300, memory 302, SOC 304 and preamplifier 308 may be viewed as collectively comprising one possible example of "control circuitry" as that term is utilized herein. Numerous alternative arrangements of control circuitry may be used in other embodiments, and such arrangements may include only a subset of the components 300, 302, 304 and 308, or portions of one or more of these components. For example, the SOC 304 itself may be viewed as an example of "control circuitry." The control circuitry of the storage device 100 in the embodiment as shown in FIG. 3 is generally configured to process data received from and supplied to the read/write head 130 and to control positioning of the read/write head 130 relative to the storage disk 110.

It should be noted that certain operations of the SOC 304 in the storage device 100 of FIG. 3 may be directed by processor 300, which executes code stored in external memory 302. For example, the processor 300 may be configured to execute code stored in the memory 302 for performing at least a portion of a write signal transition control process carried out by the SOC 304. Thus, at least a portion of the transition control functionality of the storage device 100 may be implemented at least in part in the form of software code.

The external memory 302 may comprise electronic memory such as random access memory (RAM) or read-only memory (ROM), in any combination. In the present embodiment, it is assumed without limitation that the external memory 302 is implemented at least in part as a double data rate (DDR) synchronous dynamic RAM (SDRAM), although a wide variety of other types of memory may be used in other embodiments. The memory 302 is an example of what is more generally referred to herein as a "computer-readable storage medium." Such a medium may also be writable.

Although the SOC 304 in the present embodiment is assumed to be implemented on a single integrated circuit, that integrated circuit may further comprise portions of the processor 300, memory 302, bus 306 and preamplifier 308. Alternatively, portions of the processor 300, memory 302, bus 306 and preamplifier 308 may be implemented at least in part in the form of one or more additional integrated circuits, such as otherwise conventional integrated circuits designed for use in an HDD and suitably modified to implement multiple-slope transition control circuitry as disclosed herein.

An example of an SOC integrated circuit that may be modified for use in embodiments of the invention is disclosed in U.S. Pat. No. 7,872,825, entitled "Data Storage Drive with Reduced Power Consumption," which is commonly assigned herewith and incorporated by reference herein.

Other types of integrated circuits that may be used to implement processor, memory or other storage device components of a given embodiment include, for example, a microprocessor, digital signal processor (DSP), application-specific integrated circuit (ASIC), field-programmable gate array (FPGA) or other integrated circuit device.

In an embodiment comprising an integrated circuit implementation, multiple integrated circuit dies may be formed in a repeated pattern on a surface of a wafer. Each such die may include a device as described herein, and may include other structures or circuits. The dies are cut or diced from the wafer, then packaged as integrated circuits. One skilled in the art would know how to dice wafers and package dies to produce packaged integrated circuits. Integrated circuits so manufactured are considered embodiments of the invention.

Although shown as part of the storage device 100 in the present embodiment, one or both of the processor 300 and memory 302 may be implemented at least in part within an associated processing device, such as a host computer or server in which the storage device is installed. Accordingly, elements 300 and 302 in the FIG. 3 embodiment may be viewed as being separate from the storage device 100, or as representing composite elements each including separate processing or memory circuitry components from both the storage device and its associated processing device. As noted above, at least portions of the processor 300 and memory 302 may be viewed as comprising "control circuitry" as that term is broadly defined herein.

Referring now more particularly to the preamplifier 308 of the storage device 100, the preamplifier in this embodiment comprises at least one write driver 320 that has an associated dual-slope transition controller 322. The write driver 320 in the present embodiment is assumed to comprise at least one data path. Thus, for example, the write driver 320 may comprise two data paths, such as a high side data path and a low side data path, although different numbers of data paths may be used in other embodiments. It should be noted in this regard that the term "data path" as used herein is intended to be broadly construed, so as to encompass, for example, CMOS circuitry or other types of circuitry through which a data signal passes in preamplifier 308 or another storage device component. Also, the term "write driver" is intended to encompass any type of driver circuitry that may be used to generate one or more write signals each having one or more multiple-slope data transitions.

Although illustratively shown in FIG. 3 as being implemented within the write driver 320, the dual-slope transition controller 322 may alternatively be implemented at least in part externally to the write driver, for example, using other circuitry of the preamplifier 308.

Figure 4:
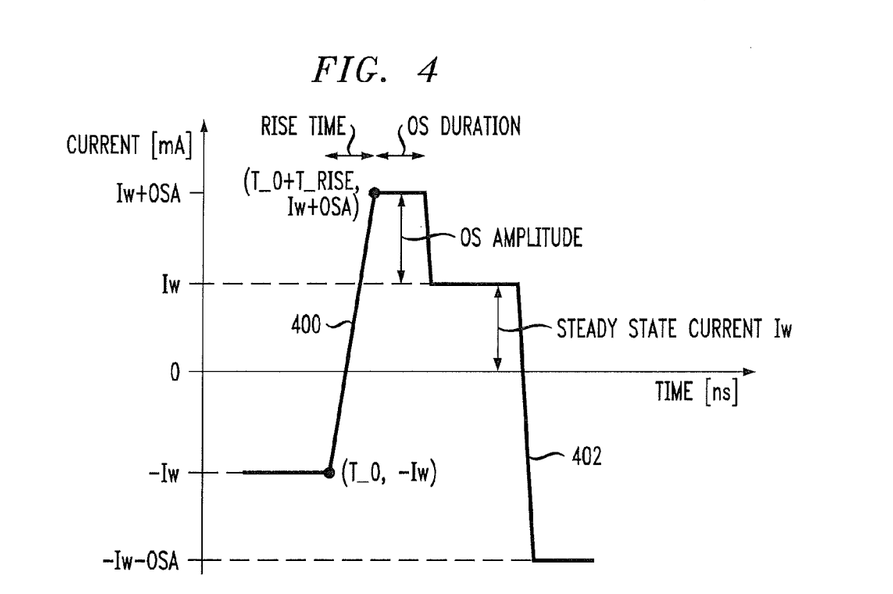
FIG. 4 shows an example of a write signal having single-slope rising and falling transitions.
Figure 5:
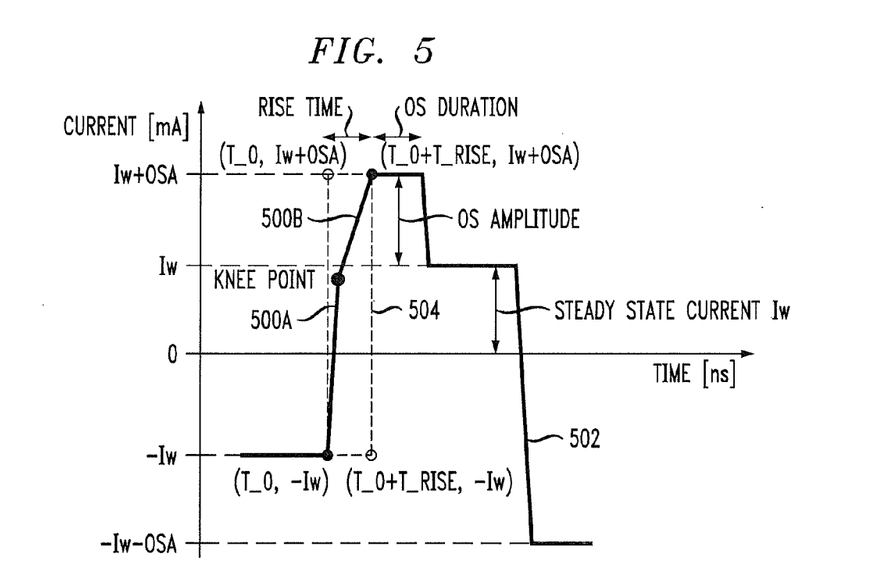
FIG. 5 illustrates the manner in which FIG. 4 write signal can be modified to include a dual-slope rising transition.

FIGS. 4 and 5 illustrate portions of write signals that may be generated in the write driver 320, with and without the use of dual-slope transition controller 322, respectively. More particularly, FIG. 4 shows an example of a write signal having single-slope rising and falling transitions, and FIG. 5 illustrates the manner in which FIG. 4 write signal can be modified to include a dual-slope rising transition. In each of these figures, a single write pulse is shown, suitable for use in writing a single data bit to the storage medium 110, and the write pulse current in mA is plotted as a function of time in nanoseconds (ns).

Referring initially to FIG. 4, the write pulse as shown includes a single-slope rising transition 400 that begins at start time T_0 and at negative write current −Iw, where Iw denotes steady state write current. As indicated previously, typical write current magnitudes are in the range of about 15 to 65 mA zero-to-peak, although other values can be used. The single-slope rising transition 400 ends at time T_0+T_rise and at write current Iw+OSA, where T_rise denotes the rise time of the data transition and OSA denotes overshoot amplitude. The figure also shows overshoot duration (OSD) of the write pulse. The falling transition 402 of the FIG. 4 write pulse is similar to the rising transition, but starts at write current Iw and ends at write current −Iw-OSA.

Increased strength in the write pulse overshoot parameters T_rise, OSA and OSD (i.e., shorter T_rise, higher OSA and longer OSD) can help to facilitate magnetic switching in the write head, leading to improved recording performance at high data rates. However, aggressive setting of the overshoot parameters will typically only lead to recording improvements up to a certain maximum data rate, due at least in part to saturation and other non-linear behavior in the write head. This non-linear behavior can produce a magnetization response waveshape that is characterized by a significant time delay (e.g., 200-500 ps), and a longer rise time relative to the rise time of the applied write signal. Slow magnetic switching of this type can degrade recording performance quickly once the above-noted maximum data rate is reached, primarily for on-track recording performance, but also adversely impacting off-track recording performance due to issues such as adjacent track erasure.

FIG. 5 shows a modified write pulse comprising a dual-slope rising transition, which can provide improved on-track and off-track recording performance, particularly at high data rates. The rising transition in this pulse is a dual-slope transition having first and second segments 500A and 500B arranged sequentially between a start point and an end point of the transition, with the slope of the first segment being greater than the slope of the second segment. The start and end points of the transition are at the coordinates [T_0, −Iw] and [T_0+T_rise, Iw+OSA], respectively.

As shown in the figure, the rising transition has a knee point located between the start point and the end point of the data transition, such that the knee point separates the two sequentially-arranged segments 500A and 500B of the data transition. It should be noted that the term "knee point" as used herein is intended to be broadly construed so as to encompass a point between segments of different slopes in a given write signal data transition. In the present embodiment, the knee point denotes a point of discontinuous first derivative in the data transition. However, the term as broadly construed should be understood to encompass other types of discontinuities in data transition slope. The knee point of the transition in this embodiment is located in a rectangle 504 defined by coordinates [T_0, −Iw] and [T_0+T_rise, Iw+OSA].

As a more particular example, the knee point in a given embodiment may be located at Iw, with a rise time from the knee point to Iw+OSA of about 40 picoseconds (ps) and a total rise time T_rise of 100 ps. As another example, the knee point in a given embodiment may be located at 5 mA, with a rise time from the knee point to Iw+OSA of about 100 picoseconds (ps) and a total rise time T_rise of 150 ps. Suitable ranges of values for Iw and OSA in these and other embodiments may be about 15-65 mA for Iw and about 0-65 mA for OSA. The total rise time of the rising transition may be in the range of about 50 to 300 ps. Of course, numerous other parameter values can be used in other embodiments.

Although the falling transition 502 in the FIG. 5 embodiment is a single-slope transition, this falling transition may also be controlled by transition controller 322 to form a dual-slope transition. In such an arrangement, the falling transition may comprise a knee point that is located in a rectangle defined by coordinates [T_0, Iw] and [T_0+T_fall, −Iw−OSA], where T_fall denotes a fall time of the data transition. Thus, in other embodiments, one or both of the rising and falling transitions of the write pulse may be multiple-slope transitions. As noted above, fall time can alternatively be characterized as a rise time for a transition of opposite polarity.

Figure 9:
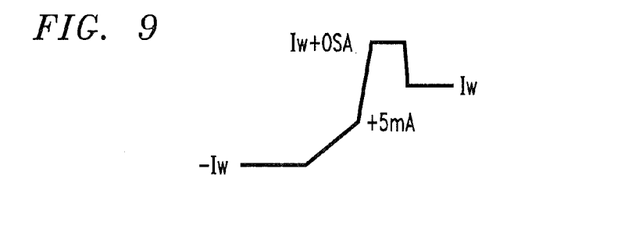
FIG. 9 shows yet another example of a write signal having a dual-slope rising transition.

Also, in other embodiments, the slope of the first segment 500A of the rising transition may be less than the slope of the second segment 500B of the rising transition. An example of a write pulse of this type is shown in FIG. 9. In such an arrangement, the knee point of the rising transition is still located in the rectangle 504 defined by coordinates [T_0, −Iw] and [T_0+T_rise, Iw+OSA].

Figure 6:
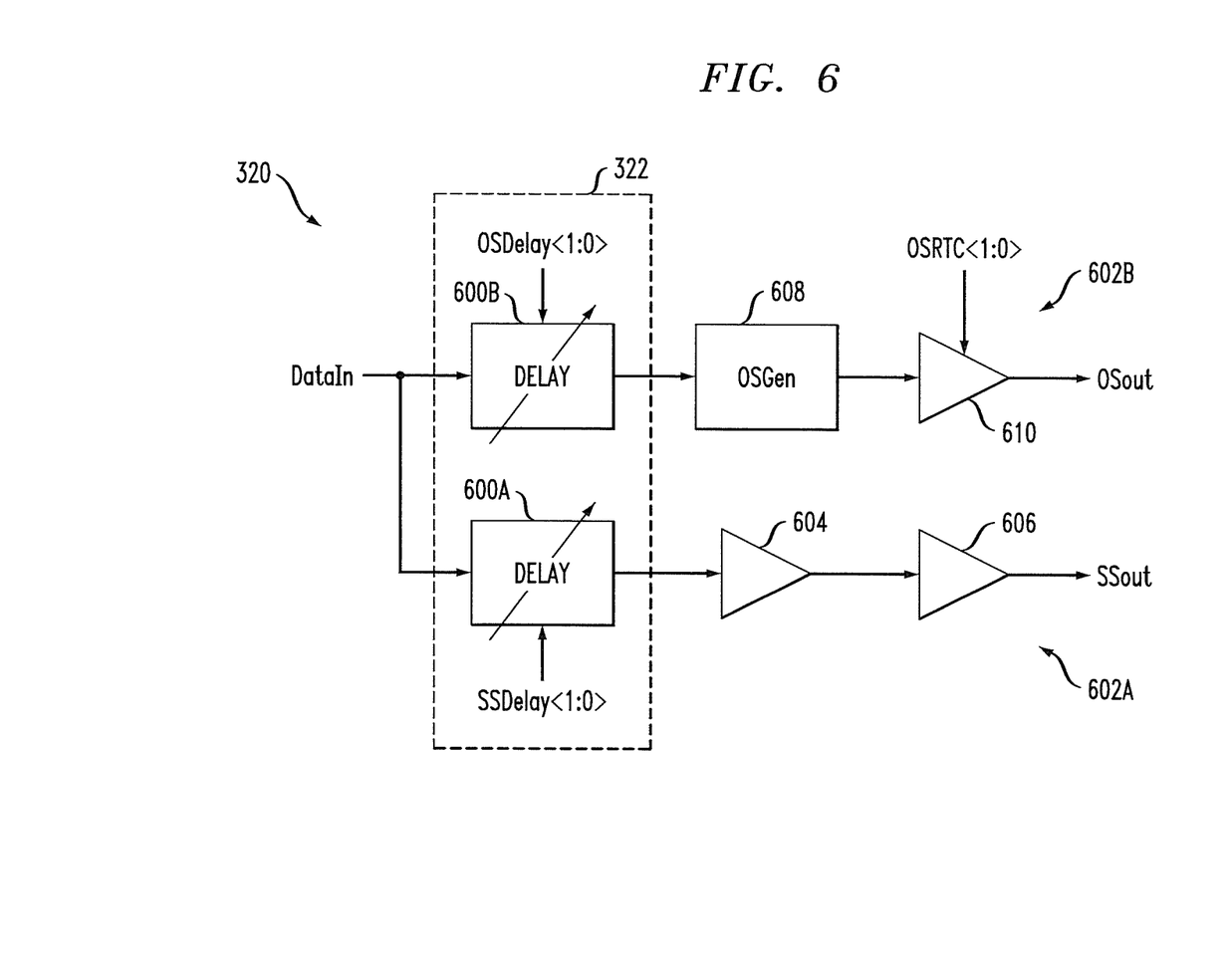
FIG. 6 shows a more detailed view of a portion of the write driver of FIG. 3 and its associated dual-slope transition controller.

Referring now to FIG. 6, the write driver 320 and its associated dual-slope transition controller 322 are shown in greater detail. It should be noted that the write driver will typically include additional circuitry beyond that shown. For example, the portion of the write driver 320 illustrated in FIG. 6 may be viewed as representing only a portion of a high side or low side data path in a write driver comprising multiple data paths. At least a portion of each such data path may comprise separate steady state (SS) and overshoot (OS) paths, which include respective circuitry blocks for steady state and overshoot waveshaping. Also, the transition controller 322 is incorporated into the write driver 320 in this embodiment, but as noted above, in other embodiments may be implemented at least in part using circuitry that is separate from but otherwise associated with the write driver.

In the FIG. 6 embodiment, the multiple-slope transition controller 322 comprises a first controllable delay element 600A arranged in a steady state path 602A of the write driver 320, and a second controllable delay element 600B arranged in an overshoot path 602B of the write driver. The first and second controllable delay elements 600A and 600B are independently controllable in a manner that allows different slopes to be established for the steady state and overshoot segments 500A and 500B of the rising transition of the FIG. 5 write pulse. More particularly, these delay elements are controlled using separate sets of control bits denoted SSDelay<1:0> and OSDelay<1:0>, respectively. Inputs of the respective first and second controllable delay elements are both adapted to receive data to be written to the storage disk, via an input terminal denoted DataIn.

The first and second controllable delay elements 600A and 600B may be viewed as examples of what are more generally referred to herein as "slope control mechanisms" for respective segments of a multiple-slope transition. Numerous other types of slope control mechanisms may be used in other embodiments, and may include dynamic slope control mechanisms, such as elements 600A and 600B, in which the amount of delay provided is controlled responsive to an applied control signal, as well as static slope control mechanisms in which a desired amount of delay is established using fixed circuit elements and is not variable during operation of the storage device. Separate control of slopes of respective transition segments herein is also intended to be broadly construed, so as to encompass any of a wide variety of different arrangements that allow different slopes to be set for the respective transition segments.

The output of the first controllable delay element 600A is coupled to an input of a first drive element 604 of the steady state path 600A, which in turn drives an input of a second drive element 606 of the steady state path 600A, producing a steady state output denoted SSout. The output of the second controllable delay element 600B is coupled to an input of an overshoot generator (OSGen) 608 of the overshoot path 602B, which in turn drives an overshoot control drive element 610, producing an overshoot output denoted OSout. The overshoot control drive element 610 serves to control one or more overshoot parameters such as overshoot pulse width responsive to control bits denoted OSRTC<1:0>. The overshoot control drive element 610 may comprise, for example, a programmable pulse generation cell that sets the overshoot pulse width. In this embodiment, the steady state drive elements 604 and 606 are matched to the overshoot drive elements 608 and 610 so that the SSout and OSout signals can be properly combined to form the write pulse.

In operation, the respective slopes of transition segments 500A and 500B are independently controlled by adjusting the values of the control bits separately for each of the controllable delay elements 600A and 600B, thereby altering the relative delays between the steady state and overshoot paths 602A and 602B. The control bit values may be programmed using processor 300, SOC 304 or one or more other storage device components, in any combination, as required in order to provide the desired dual-slope transition. By delaying one of the steady state and overshoot paths 602A and 602B with respect to the other, the position of the knee point within the rectangle 504 of FIG. 5 can be modified, such that dual-slope waveshaping is achieved for the write pulse.

Although only two control bits are provided for each of the steady state delay control and the overshoot delay control in this embodiment, other embodiments can use more than two control bits for the steady state delay control, the overshoot delay control, or both. Also, different numbers of control bits can be used for steady state delay control and overshoot delay control. The logic levels of the respective control bits adjust the delay in the corresponding steady state and overshoot paths in a manner that alters the slopes of the respective segments 500A and 500B. This adjustment in delay responsive to the control bit values can be implemented, for example, using circuitry that is operative to adjust one or more circuit time constants, such as by including or removing a resistor, responsive to the logic level of a corresponding control bit. Numerous other techniques for providing controllable delay responsive to control bits will be apparent to those skilled in the art. Also, as indicated above, static slope control circuitry may be used, in which the delay is not dynamically controllable but is instead fixed by design. The latter static arrangements are considered a type of "slope control mechanism" as that term is broadly utilized herein.

Figure 7:
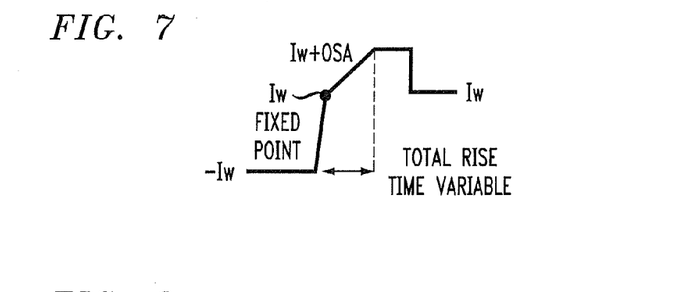
FIG. 7 shows another example of a write signal having a dual-slope rising transition similar to that of FIG. 5.

Additional details relating to one or more embodiments of the invention will now be described with reference to FIGS. 7 through 10. FIG. 7 shows another example of a write pulse similar to that previously described in conjunction with FIG. 5, but with the knee point coinciding with the current value Iw. FIG. 9 shows another example of a write pulse in which the slope of the lower segment of the dual-slope transition is less than the slope of the upper segment, rather than greater than the slope of the upper segment as in the examples of FIGS. 5 and 7. Examples of head magnetization processes associated with the write pulses of FIGS. 7 and 9 will be described in conjunction with FIGS. 8 and 10, respectively.

The FIG. 7 write pulse waveform has a fast first slope from −Iw to a knee point at a predefined value of approximately Iw, followed by a slow second slope from the knee point to Iw+OSA. This waveform can be beneficial for improving off-track recording performance without sacrificing on-track recording performance. A fast first slope has a magnetic effect similar to that of a single-slope waveform, but the slow second slope prevents strong out-of-plane magnetization excitation of head shields. Moreover, improvement in on-track performance may be observed for specific data rates and OSD settings due to more time spent above critical current levels corresponding to the magnetization switching levels in write heads.

With reference now to FIG. 8, the write pulse waveform illustrated in FIG. 7 can be particularly helpful for specific head designs, such as a head 130' having a taper 800 and an elongated pole tip 802, configured for recording data in a data layer 804 of the storage disk 110. In this arrangement, the fast slope initiates the magnetization switching in the taper 800 while the slow slope gives additional torque to switch the magnetization of the pole tip 802 as the reversal vertical domain wall reaches it.

The FIG. 9 write pulse waveform has a slow first slope from −Iw to a knee point at a predefined value of approximately +5 mA, followed by a fast second slope from the knee point to Iw+OSA. This waveform can be beneficial for writing transitions from a saturated state of the head 130, as illustrated in FIG. 10, which shows variations in head magnetization during the write pulse, for a head 130" having a more gradual taper 1000 and less elongated pole tip 1002, configured for recording data in a data layer 1004 of the storage disk 110.

In this embodiment, the write pulse waveform facilitates the writing of transitions from the saturated state of the head due to a slow preparatory stage. The slow first slope assists to de-saturate the head taper before magnetization switching without degradation of the previous bit recording, keeping the magnetization state of the pole tip the same as before the slow first slope. The following fast second slope is very effective for magnetization switching in the pole tip. The obtained magnetic rise time is significantly reduced which is very beneficial in many cases, such as recording frequent transitions at fast data rate (e.g., 0101010), or for recording a transition after a long bit sequence without transitions (e.g., 000001 or 111110). Also, an improvement in off-track performance is obtained due to the smaller current jump of the second slope (i.e., from knee point to Iw+OSA) as compared to the current jump of the single-slope waveform. As mentioned previously, it has been observed that factors such as faster rise time and higher amplitude can lead to stronger magnetization excitation of head shields during switching and cause parasitic erasure of adjacent tracks.

It is to be appreciated that the particular circuitry arrangements, write signal waveforms and head magnetization configurations shown in FIGS. 3-10 are presented by way of example only, and other embodiments of the invention may utilize other types and arrangements of elements for implementing multiple-slope transition control functionality for one or more write signals as disclosed herein.

As mentioned previously, the storage device configuration can be varied in other embodiments of the invention. For example, the storage device may comprise a hybrid HDD which includes a flash memory in addition to one or more storage disks.

It should also be understood that the particular storage disk configuration and recording mechanism can be varied in other embodiments of the invention. For example, a variety of recording techniques including SMR, BPM, HAMR and MAMR can be used in one or more embodiments of the invention.

Figure 11:
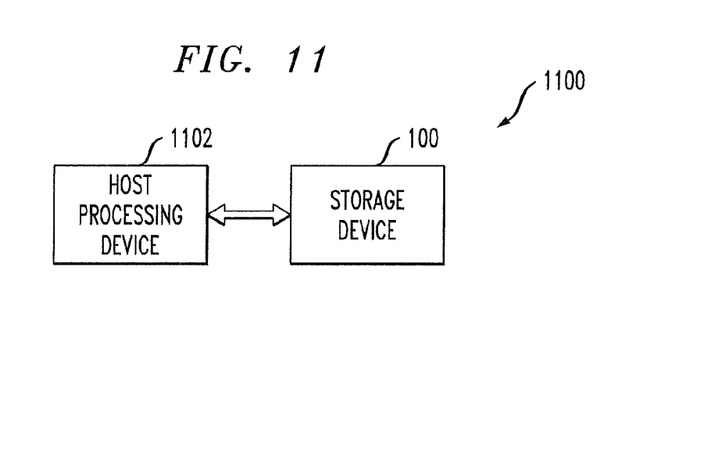
FIG. 11 illustrates interconnection of the storage device of FIG. 1 with a host processing device in a data processing system.

FIG. 11 illustrates a processing system 1100 comprising the disk-based storage device 100 coupled to a host processing device 1102, which may be a computer, server, communication device, etc. Although shown as a separate element in this figure, the storage device 100 may be incorporated into the host processing device. Instructions such as read commands and write commands directed to the storage device 100 may originate from the processing device 1102, which may comprise processor and memory elements similar to those previously described in conjunction with FIG. 3.

Figure 12:
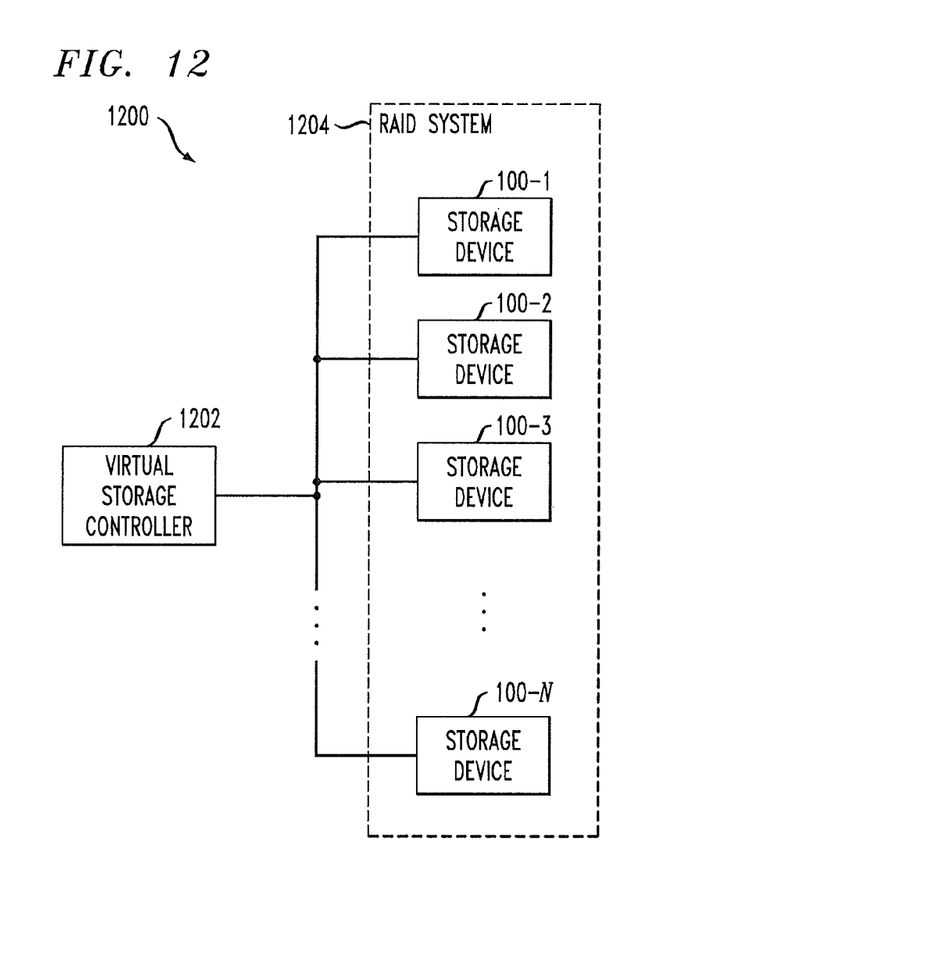
FIG. 12 shows a virtual storage system incorporating a plurality of disk-based storage devices of the type shown in FIG. 1.

Multiple disk-based storage devices 100 may be incorporated into a virtual storage system 1200 as illustrated in FIG. 12. The virtual storage system 1200, also referred to as a storage virtualization system, illustratively comprises a virtual storage controller 1202 coupled to a RAID system 1204, where RAID denotes Redundant Array of Independent Disks. The RAID system more specifically comprises N distinct storage devices denoted 100-1, 100-2, . . . 100-N, one or more of which are assumed to be configured to include multiple-slope transition control for write signals as disclosed herein. These and other virtual storage systems comprising HDDs or other disk-based storage devices of the type disclosed herein are considered embodiments of the invention. The host processing device 1102 in FIG. 11 may also be an element of a virtual storage system, and may incorporate the virtual storage controller 1202.

Again, it should be emphasized that the above-described embodiments of the invention are intended to be illustrative only. For example, other embodiments can use different types and arrangements of storage disks, read/write heads, control circuitry, preamplifiers, write drivers and other storage device elements for implementing the described transition control functionality. Also, the particular manner in which write signal transitions are configured to include multiple slopes may be varied in other embodiments. These and numerous other alternative embodiments within the scope of the following claims will be apparent to those skilled in the art.

What is claimed is:

1. An apparatus comprising:
control circuitry adapted for association with a read/write head configured to read data from and write data to a storage disk, the control circuitry being configured to process data received from and supplied to the read/write head;
wherein the control circuitry comprises:
a write driver configured to generate a write signal for data to be written to the storage disk; and
a multiple-slope transition controller associated with the write driver and configured to control a data transition in said write signal such that said data transition comprises at least two different segments each having a different slope, said multiple-slope transition controller comprising separate slope control mechanisms for each of said segments.

2. The apparatus of claim 1 wherein the data transition comprises one of a rising transition and a falling transition.

3. The apparatus of claim 1 wherein the data transition comprises a dual-slope transition having first and second segments arranged sequentially between a start point and an end point of the data transition with the slope of the first segment being greater than the slope of the second segment.

4. The apparatus of claim 1 wherein the data transition comprises a dual-slope transition having first and second segments arranged sequentially between a start point and an end point of the data transition with the slope of the first segment being less than the slope of the second segment.

5. The apparatus of claim 1 wherein the data transition has at least one knee point located between a start point and an end point of the data transition, with a given knee point separating two sequentially-arranged segments of the data transition.

6. The apparatus of claim 5 wherein the data transition is a rising transition and the knee point is located in a rectangle defined by coordinates [T_0, −Iw] and [T_0+T_rise, Iw+OSA], where T_0 denotes a start time of the data transition, T_rise denotes a rise time of the data transition, Iw denotes steady state current, OSA denotes overshoot amplitude, −Iw denotes a start current amplitude of the data transition, and Iw+OSA denotes an end current amplitude of the data transition.

7. The apparatus of claim 5 wherein the data transition is a falling transition and the knee point is located in a rectangle defined by coordinates [T_0,Iw] and [T_0+T_fall,−Iw−OSA], where T_0 denotes a start time of the data transition, T_fall denotes a fall time of the data transition, Iw denotes steady state current, OSA denotes overshoot amplitude, Iw denotes a start current amplitude of the data transition, and −Iw−OSA denotes an end current amplitude of the data transition.

8. The apparatus of claim 1 wherein the multiple-slope transition controller is at least partially incorporated into the write driver.

9. The apparatus of claim 1 wherein the separate slope control mechanisms comprise:
a first controllable delay element arranged in a steady state path of the write driver for controlling a slope of a first one of the segments; and
a second controllable delay element arranged in an overshoot path of the write driver for controlling a slope of a second one of the segments.

10. The apparatus of claim 9 wherein the first and second controllable delay elements are independently controllable in a manner that allows different slopes to be established for steady state and overshoot segments of the data transition.

11. The apparatus of claim 9 wherein inputs of the respective first and second controllable delay elements are both adapted to receive the data to be written to the storage disk.

12. The apparatus of claim 9 wherein an output of the first controllable delay element is coupled to an input of a drive element of the steady state path, and an output of the second controllable delay element is coupled to an input of an overshoot generator of the overshoot path.

13. The apparatus of claim 1 wherein the control circuitry is fabricated in at least one integrated circuit.

14. A storage device comprising the apparatus of claim 1.

15. A virtual storage system comprising the storage device of claim 14.

16. The apparatus of claim 1 wherein the control circuitry further comprises:
at least one integrated circuit comprising a disk controller and read channel circuitry; and
a preamplifier coupled between said at least one integrated circuit and the read/write head;
wherein the write driver and its associated multiple-slope transition controller are implemented in the preamplifier.

17. The apparatus of claim 1 comprising a processor and a memory coupled to the processor, wherein at least a portion of the control circuitry is implemented by the processor executing software code stored in the memory.

18. The apparatus of claim 1 wherein the different slopes for each of said segments are controlled responsive to respective control signals applied to the multiple-slope transition controller.

19. The apparatus of claim 1 wherein a first slope for a first segment of said segments is controlled responsive to a first control signal applied to a first slope control mechanism, and a second slope for a second segment of said segments is controlled responsive to a second control signal applied to a second slope control mechanism.

20. A method comprising the steps of:
receiving data to be written to a storage disk of a storage device; and
generating a write signal for the data to be written to the storage disk, the write signal having a plurality of data transitions, with at least one of said data transitions comprising at least two different segments each having a different slope;
wherein the generating step comprises separately controlling each of said segments.

21. A non-transitory computer-readable storage medium having embodied therein executable code for performing the steps of the method of claim 20.

22. A processing system comprising:
a processing device; and
a storage device coupled to the processing device and comprising at least one storage disk;
wherein the storage device further comprises:
a read/write head configured to read data from and write data to the storage disk; and
control circuitry configured to process data received from and supplied to the read/write head;
the control circuitry comprising:
a write driver configured to generate a write signal for data to be written to the storage disk; and
a multiple-slope transition controller associated with the write driver and configured to control a data transition in said write signal such that said data transition comprises at least two different segments each having a different slope, said multiple-slope transition controller comprising separate slope control mechanisms for each of said segments.

* * * * *